March 20, 1956
F. O. LAVEEN
2,738,588
RIVET SCALE
Filed Dec. 22, 1954
2 Sheets-Sheet 2
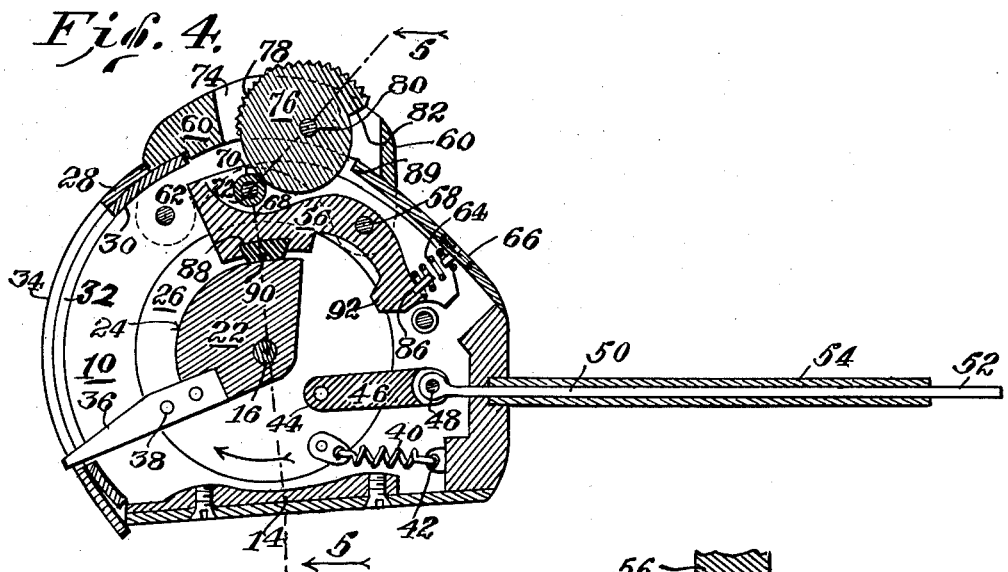
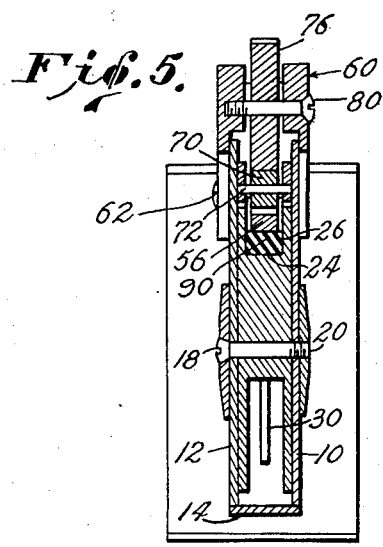
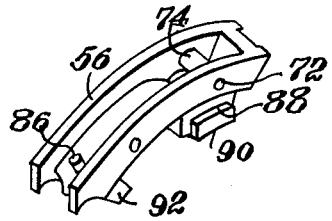
| Code Numbers | | | |
|---|---|---|---|
| 3 | 4 | 5 | 6 |
| 5 32 | 3 16 | 7 32 | 1 4 |
| 3 16 | 7 32 | 1 4 | 9 32 |
| 7 32 | 1 4 | 9 32 | 5 16 |
| 1 4 | 9 32 | 5 16 | 11 32 |
| 9 32 | 5 16 | 11 32 | 3 8 |
| 5 16 | 11 32 | 3 8 | 13 16 |
| 11 32 | 3 8 | 13 32 | 7 16 |
| 3 8 | 13 32 | 7 16 | 15 32 |
| 13 32 | 7 16 | 15 32 | 1 2 |
| 7 16 | 15 32 | 1 2 | 17 32 |
| 15 32 | 1 2 | 17 32 | 9 16 |
| 1 2 | 17 32 | 9 16 | 19 32 |
| 17 32 | 9 16 | 19 32 | 5 8 |
| 9 16 | 19 32 | 5 8 | 21 32 |
| 19 32 | 5 8 | 21 32 | 11 16 |
INVENTOR.
FRANK O. LAVEEN.
BY
Attorney.

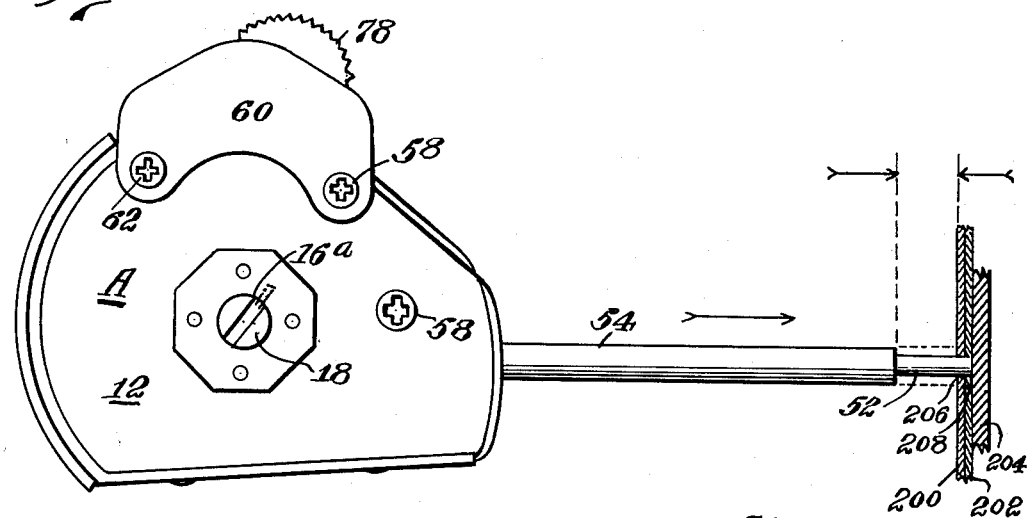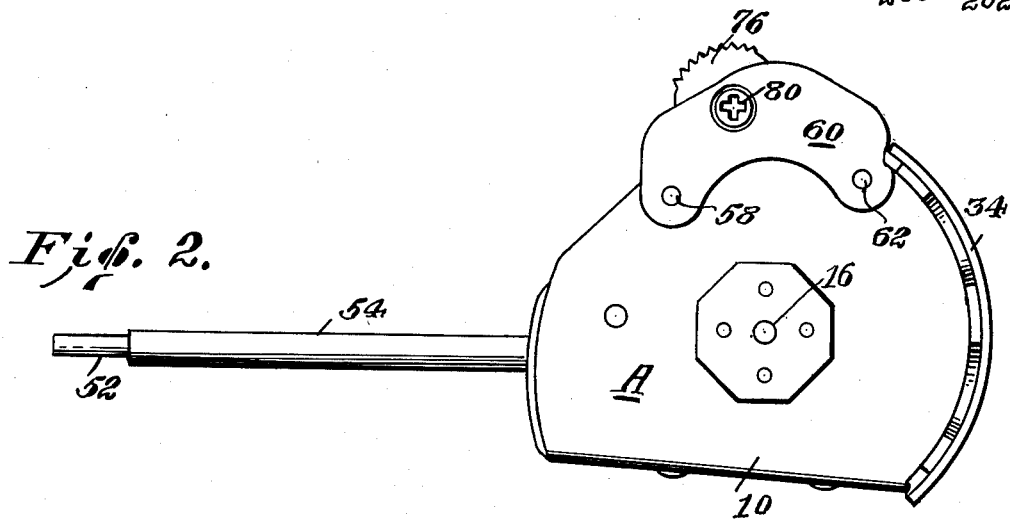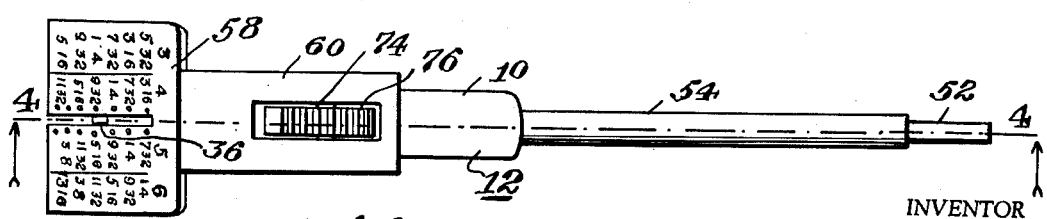

United States Patent Office 2,738,588
Patented Mar. 20, 1956

2,738,588

RIVET SCALE

Frank O. Laveen, Phoenix, Ariz.

Application December 22, 1954, Serial No. 477,078

6 Claims. (Cl. 33—172)

This invention relates to a rivet scale and is concerned with a mechanism for very accurately determining the size rivet to be used in riveting sheets, and is particularly adaptable in fabricating the parts of aircraft fuselages, airfoils and other aeroplane parts.

A particular object of the invention is to provide a device which is composed of a minimum of parts which will accurately indicate, in accordance with a scale, the size rivet to be used.

Another object is to provide a device having brake mechanism which positively locks the indicating hand in any position to which it has been moved.

A further object is to provide a novel scale and indicating hand mechanism for a rivet scale.

Yet another object is to provide locking means for a brake which is manually moved to and from the indicating hand locking position.

A further object is to provide novel brake shoe mechanism for engaging a plurality of surfaces for the rotary disc-like member which supports the indicating hand.

Other objects will appear hereinafter throughout the specification.

In the drawings:

Figure 1 is a side elevation of the rivet scale;

Figure 2 is a side elevation of the scale taken from the opposite side from Figure 1;

Figure 3 is a top plan view of the scale;

Figure 4 is a vertical section on the line 4—4 of Figure 3 with the measuring pin shown in full lines;

Figure 5 is a section taken on the line 5—5 of Figure 4;

Figure 6 is a detailed fragmental view showing the engagement of the block of rubber with the disc-like member;

Figure 7 is an enlarged front view of the scale; and

Figure 8 is an enlarged perspective view of the brake shoe.

Referring to the drawings, the rivet scale of this invention is indicated as a whole by the letter A. The casing parts for all moving elements, except the measuring pin, is shown at 10 and 12, the former of which is provided with an integral flange bottom 14, as shown in Figure 5.

The casing parts are held in assembled position by the king pin 16 having a slotted head 18, and a threaded end 20 which engages the internal threads of the casing part 10, as shown in Figure 5. Locking means to prevent rotation of the head 16 is shown at 16a.

Rotatably mounted on the king pin is a rotatable disc-like member 22, having a brake surface peripheral section 24 and two radial flange brake sections 26.

One casing part has a peripheral section 30 on which is mounted a scale plate 28, as shown in Figure 4, the section and scale plate each having a slot, as indicated at 32 and 34, respectively, for the pivotal movements of the hand 36 which is mounted at 38 on the rotating disc-like member 22.

The disc-like member is biased in a counter-clockwise direction by indicator release spring 40 anchored at 42 to one of the casing parts.

Pivotally mounted to the member 22 at one of its ends, as shown at 44, is the measuring pin extension link 46. The link's other end is pivotally connected at 48 to the measuring pin 50, whose free end 52 extends beyond the measuring pin guide 54, as shown in Figures 1, 2 and 4. The movements of the measuring pin are effected by the spring 40 and by the brake mechanism now to be described.

A brake shoe 56 is mounted on both of the casing parts by the pivot pin 58. This pivot is actually one of the screws that removably holds the bracket support 60 in position on the casing parts 10, 12, the other screw for this support being indicated at 62. The brake shoe is biased in a clockwise direction of movement by the expansion spring 64, one of whose ends is removably supported by the headed screw 66, and whose other end bears against the right end of the brake shoe as shown at 86 in Figure 4. The upper other end of the brake shoe has a cut-out portion 68 for housing the roller 70 mounted on pin 72 for a purpose now to be described.

The bracket support 60 for the stop cam is in the shape of a saddle in cross-section as shown in the several figures. This support is provided with a recess or passageway 74 for the reception of the combined stop and release cam 76 having a cam surface 78 and rotatably mounted on the pin 80 that extends across the recess and is supported by the sides of the bracket support. As shown in Figure 4, the low part of the cam surface 78 is in contact with roller 70 of brake shoe 56. A portion of the cam 76 is knurled for engagement by the finger in order to rotate the cam.

It will be noted that the cam can be rotated in a clockwise direction beyond the position shown in Figure 4 for the purpose of releasing the brake, due to space between the shoulder 82 of the cam and the abutment 89 of the casing member.

Mounted adjacent the lower free end of the brake shoe 56 is a recess for the reception of the block of rubber, or rubber-like material 90 that engages the peripheral brake surface section 24 and the two radial brake surface sections 26, all of which sections form part of the disc-like member 22 that is connected to the measuring pin 52.

*Operation*

When the cam 76 is rotated manually in a counter-clockwise direction, the cam surface 78 thereof engages the roller 70 to cause the brake shoe to move downwardly on pivot 58, to cause the rubber block 90 to engage surfaces 24 and 26, to thereby stop rotation of the disc-like member 22 and lock the measuring pin in position.

It will be noted that the brake arm is provided with a boss 92 that lightly engages the sides 26 to hold the parts in the released position with the hand 36 at the position shown in Figure 4. Rotation of the cam in a clockwise direction will permit the brake shoe also to rotate in a clockwise direction, away from the braking surfaces of member 22.

The scale is provided with four divided columns 96, 98, 100 and 102, each located below the code numbers 104, 106, 108 and 110, respectively.

Numbers 1 to 15 on the scale indicate depth of the drilled hole in 32nds of an inch.

The dots 114 and 116 on the scale plate 28 adjacent slot 34 show the center line for a reading of the scale.

The above is a statement of the operation of the mechanism within the casing, and particularly the brake elements and means for operating the same.

When it is desired to take a measurement, a bucking bar, such as shown at 204 in Figure 1, is placed on the opposite side of the sheets 200 and 202 to be riveted.

The measuring pin free end 52 is then inserted into the aligned holes 206 and 208 in the sheets as shown in full lines in Figure 1. In this position, the parts are as shown in Figure 4, with the indicating hand 36 shown in the lowermost position. The instrument is then pushed to the right, as shown in Figures 1 and 4, until the measuring pin guide 54 engages the sheets 200, as shown in dotted lines in Figure 1. With the parts in these positions, the stop and release cam is rotated counterclockwise to cause the cam portion 78 thereof to engage the roller 70 and force the brake shoe 56 into the position shown in Figure 6, where the rubber block 90 engages both sides and the bottom of the groove, the bottom of the groove being designated by the numeral 24 and the sides by the numeral 26, 26, of the rotatable disc-like member 22. The finger can then be released from the knurled portion of the stop and release cam 76, and the parts will be held with the right hand end of the guide against the sheet 200. At this time, the hand 36 will have been moved upwardly in the slot 34 of the scale plate to indicate the proper length of rivet to be used.

The parts may be restored to the position shown in Figure 4, where the brake is in engagement with the parts shown in Figure 6 by a rotation of the stop and release cam 76 in a clockwise direction, with the spring 64 causing the brake shoe 56 to pivot about the pivot 58.

The dotted lines in Figure 1 at the right thereof indicate the position of the guide 54 when the tool has been pushed to the right to secure a measurement for the aligned holes 206 and 208.

Cam 76 will remain fixed in all positions of adjustment even after the finger is removed from the stop and release cam.

The above description and drawings disclose a single embodiment of the invention, and specific language has been employed in describing the several figures. It will nevertheless be understood that no limitations of the scope of the invention are thereby contemplated, and that various alterations and modifications may be made such as would occur to one skilled in the art to which the invention relates.

I claim:

1. A rivet scale comprising a measuring pin, a rotary member, means connecting said pin to said rotary member, a scale, an indicator means on said rotary member, brake means cooperating with said rotary member whereby to stop the rotation of said rotary member, indicator means and measuring pin, and means mounting said elements in operative relationship, said brake means including a brake shoe, means pivotally mounting said brake shoe on said last named means, said brake shoe having a recess, a roller in said recess and means engaging said roller whereby to operate said brake shoe.

2. A rivet scale comprising a measuring pin, a rotary member, means connecting said pin to said rotary member, a scale, an indicator means on said rotary member, brake means cooperating with said rotary member whereby to stop the rotation of said rotary member, indicator means and measuring pin, and means mounting said elements in operative relationship, said brake means including a brake shoe, means pivotally mounting said brake shoe on said last named means, and manually operated cam means engaging said brake shoe whereby to lock said brake shoe.

3. A rivet scale comprising a measuring pin, a rotary member, means connecting said pin to said rotary member, a scale, an indicator means on said rotary member, brake means cooperating with said rotary member whereby to stop the rotation of said rotary member, indicator means and measuring pin, means mounting said elements in operative relationship, said brake means including a brake shoe, and means pivotally mounting said brake shoe on said last named means, said brake shoe having block means composed of deformable rubber-like material, said rotary member having circumferential and radial braking surfaces adapted to be engaged by said block means of deformable rubber-like material.

4. A rivet scale comprising a measuring pin, a rotary member, means connecting said pin to said rotary member, a scale, an indicator means on said rotary member, brake means cooperating with said rotary member whereby to stop the rotation of said rotary member, indicator means and measuring pin, means mounting said elements in operative relationship, said brake means including a brake shoe, means pivotally mounting said brake shoe on said last named means, said brake shoe having a recess, a roller in said recess, cam means engaging said roller whereby to operate said brake shoe, and a removable bracket support for said cam means on said mounting means.

5. A rivet scale comprising a measuring pin, a rotary member, means connecting said pin to said rotary member, a scale, an indicator means on said rotary member, brake means cooperating with said rotary member whereby to stop the rotation of said rotary member, indicator means and measuring pin, means mounting said elements in operative relationship, said brake means including a brake shoe, means pivotally mounting said brake shoe on said last named means, said brake shoe having a recess, a roller in said recess, and cam means engaging said roller whereby to operate said brake shoe, said cam means including a rotary member, and means for supporting the same on said mounting means.

6. A rivet scale comprising a measuring pin, a rotary member, means connecting said pin to said rotary member, a scale, an indicator means on said rotary member, brake means cooperating with said rotary member whereby to stop the rotation of said rotary member, indicator means and measuring pin, means mounting said elements in operative relationship, said brake means including a brake shoe, means pivotally mounting said brake shoe on said last named means, said brake shoe having a recess, a roller in said recess, cam means engaging said roller whereby to operate said brake shoe, and a removable bracket support for said cam means on said mounting means, said bracket support having an attaching means for holding the same on said element supporting means, said attaching means forming the pivotal support of said brake shoe means.

References Cited in the file of this patent

UNITED STATES PATENTS

| 1,171,410 | Bono | Feb. 15, 1916 |
| 2,287,273 | Rabb | June 23, 1942 |

FOREIGN PATENTS

| 264,013 | Switzerland | Dec. 16, 1949 |